United States Patent
Stelman et al.

(10) Patent No.: US 7,175,708 B1
(45) Date of Patent: Feb. 13, 2007

(54) RECOVERING PURIFIED WATER AND POTASSIUM CHLORIDE FROM SPENT BASIC HYDROGEN PEROXIDE

(75) Inventors: David Stelman, Thousand Oaks, CA (US); Steven M. Klee, Agoura Hills, CA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 11/193,060

(22) Filed: Jul. 28, 2005

(51) Int. Cl.
 *C30B 25/00* (2006.01)
(52) U.S. Cl. ............... 117/85; 252/186.43; 423/499.1; 423/499.3
(58) Field of Classification Search ............ 117/85; 252/186.43; 423/499.1, 499.3
 See application file for complete search history.

(56) References Cited

U.S. PATENT DOCUMENTS

| | | |
|---|---|---|
| 2,000,815 A | 5/1935 | Berl |
| 3,969,201 A | 7/1976 | Oloman et al. |
| 4,118,305 A | 10/1978 | Oloman et al. |
| 4,246,252 A | 1/1981 | McDermott et al. |
| 4,310,502 A | 1/1982 | Wagner |
| 4,357,217 A | 11/1982 | Kuehn et al. |
| 4,384,931 A | 5/1983 | Jasinski et al. |
| 4,406,758 A | 9/1983 | McIntyre et al. |
| 4,430,176 A | 2/1984 | Davison |
| 4,445,986 A | 5/1984 | McIntyre et al. |
| 4,457,953 A | 7/1984 | McIntyre et al. |
| 4,511,441 A | 4/1985 | McIntyre et al. |
| 4,880,608 A | 11/1989 | Stelman |
| 4,891,107 A | 1/1990 | Dong et al. |
| 4,921,587 A | 5/1990 | Dong et al. |
| 4,927,509 A | 5/1990 | Mathur et al. |
| 5,277,891 A | 1/1994 | Newcomb et al. |
| 5,308,366 A | 5/1994 | Stelman |
| 5,378,449 A | 1/1995 | Dinges |
| 5,507,935 A | 4/1996 | Coleman et al. |
| 5,565,073 A | 10/1996 | Fraser et al. |
| 5,624,654 A | 4/1997 | Clendening, Jr. et al. |
| 5,647,968 A | 7/1997 | Fraser et al. |
| 5,658,488 A * | 8/1997 | Lonergan et al. ...... 252/186.43 |
| 5,693,267 A | 12/1997 | Beshore et al. |
| 5,702,585 A | 12/1997 | Hillrichs et al. |

(Continued)

*Primary Examiner*—Felisa Hiteshew
(74) *Attorney, Agent, or Firm*—Ingrassia Fisher & Lorenz, P.C.

(57) ABSTRACT

Methods and apparatus are provided for the removal and purification of the water and salt by-products from spent BHP emitted from a lasing process. The apparatus comprises a liquid processing system that freezes the water and salt by-products into a slurry, and then separates out the water (as ice) and salt components by filtering in a centrifuge. In order to remove as much residual BHP from the wet mixed ice-salt component as possible, a heat source is used to partially melt ice crystals, thereby generating an aqueous rinsing liquid on the surface of the wet mixed ice-salt crystals. The applied centrifugal force causes a continual displacement of the liquid film wetting the surface, so that it becomes progressively diluted. As such, the purification of the mixture of ice and salt crystals is implemented with an aqueous (water) rinse that is unaffected by the sub-freezing temperatures within the centrifuge. The separation and purification may also be performed with a filter in which the conventional built-in water rinse is replaced with a heat source. The filter's driving force, for example gas pressure or vacuum, would be continuously applied during warming.

20 Claims, 2 Drawing Sheets

U.S. PATENT DOCUMENTS

| | | |
|---|---|---|
| 5,735,469 A | 4/1998 | Rodriguez et al. |
| 5,837,206 A | 11/1998 | Traffenstedt et al. |
| 5,859,863 A | 1/1999 | Clendening, Jr. et al. |
| 5,907,573 A | 5/1999 | Ullman et al. |
| 6,004,449 A | 12/1999 | Vetrovec |
| 6,010,640 A | 1/2000 | Beshore et al. |
| 6,154,478 A | 11/2000 | Vetrovec |
| 6,159,349 A | 12/2000 | Wakita et al. |
| 6,224,786 B1 | 5/2001 | Stelman |
| 6,339,605 B1 | 1/2002 | Vetrovec |
| 6,366,594 B1 | 4/2002 | Bauer et al. |
| 6,553,054 B1 | 4/2003 | Bauer et al. |
| 6,562,225 B2 | 5/2003 | Vetrovec |
| 6,603,793 B2 | 8/2003 | Vetrovec |
| 6,621,848 B1 | 9/2003 | Ullman et al. |
| 6,625,193 B2 | 9/2003 | Vetrovec |
| 6,650,681 B1 | 11/2003 | Ullman et al. |
| 6,674,781 B1 | 1/2004 | Dickerson et al. |
| 6,686,077 B2 | 2/2004 | Rice et al. |
| 6,687,279 B2 | 2/2004 | Ullman et al. |
| 6,714,579 B2 | 3/2004 | Ullman et al. |
| 6,763,051 B2 * | 7/2004 | Bunn et al. .................. 372/89 |
| 6,776,328 B2 | 8/2004 | Rice et al. |
| 6,810,060 B2 | 10/2004 | Vetrovec |
| 2003/0198264 A1 | 10/2003 | Vetrovec et al. |
| 2003/0213701 A1 | 11/2003 | Amdisen et al. |
| 2004/0125849 A1 | 7/2004 | Ullman et al. |
| 2004/0179572 A1 | 9/2004 | Bunn et al. |
| 2004/0179990 A1 | 9/2004 | Bunn et al. |
| 2005/0025209 A1 | 2/2005 | Ullman et al. |

* cited by examiner

RECOVERING PURIFIED WATER AND POTASSIUM CHLORIDE FROM SPENT BASIC HYDROGEN PEROXIDE

TECHNICAL FIELD

The present invention generally relates to fuel regeneration for a chemical oxygen iodine laser (COIL), and more particularly relates to recovering purified water ($H_2O$) and potassium chloride (KCl) from spent basic hydrogen peroxide (BHP).

BACKGROUND

The chemical oxygen iodine laser (COIL) is typically configured as a medium to high power laser for both industrial and military applications. A COIL laser can generally produce output power on the order of about 100 kW or less to a megawatt or more. For industrial applications, COIL lasers can be used for cutting metals and other substances. In the military arena, COIL lasers are particularly useful in precision strike situations where it is desirable to minimize collateral damage. COIL lasers can be mounted on spacecraft, aircraft, ships and land-based vehicles for various military purposes, such as missile defense.

COIL lasers are conventionally fueled by reacting a basic hydrogen peroxide solution (BHP) with chlorine gas to form singlet delta oxygen ($O_2(^1\Delta)$) or singlet molecular oxygen that reacts with iodine to produce photon emissions in the form of a laser beam. The conventional lasing process typically generates waste by-products, such as oxygen and a spent BHP solution that typically contains excess water and an alkali chloride (e.g. KCl, NaCl, LiCl) or the like. The spent BHP and exhaust gases are typically discarded, subject to applicable regulations for disposal of a hazardous waste. Alternatively, the waste by-products could be converted into reusable fuels by a fuel regeneration system in order to address the logistical needs of a COIL weapon system. The regeneration process entails the removal of waste products from lasing, such as KCl (salt) and water, in a form useful for the efficient production of the consumed chemicals (i.e., potassium hydroxide, hydrogen peroxide and chlorine).

Removal of the water waste product can be achieved through vacuum distillation, but this process is generally not desirable for mobile or transportable applications such as military weapon systems, because it tends to be energy-intensive and typically requires large equipment. An alternative process that would generally be more compact and energy efficient involves the freezing of ice from the spent BHP, but this process tends to generate a product excessively contaminated with BHP chemicals. In order to purify this type of contaminated product, conventional techniques typically include washing, preferably with water. Washing with water, however, is generally impractical for this application due to the extremely low BHP/ice temperature, which is typically in the approximate range of −20 to −50 degrees Celsius, and would cause freeze-up of an aqueous wash fluid. Alternative washing fluids, such as non-aqueous solvents have generally proven relatively ineffective in achieving the desired product purity. As such, the overall efficiency of a fuel regeneration system is typically reduced due to BHP contamination, which tends to increase the size, weight and cost of a COIL fuel regeneration system.

Accordingly, it is desirable to provide a method and apparatus for purifying contaminated ice from spent BHP without the risk of wash freeze-up. In addition, it is desirable to provide a purifying method and apparatus that is both compact and energy efficient. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for purifying the salt and water waste products of spent basic hydrogen peroxide (BHP) emitted from a laser. One method comprises the steps of partially crystallizing the spent BHP under conditions which produce a mixture of water (as ice) and salt crystals in a BHP slurry by freezing, separating out the crystallized water (ice) and salt product from the slurry, warming the crystallized mixed ice-salt product to generate an aqueous rinsing liquid on the surface of the crystallized ice and salt product, and displacing the aqueous rinsing liquid on the surface of the crystallized salt product to largely remove residual spent BHP. Displacement may continue until a predetermined level of purification is achieved.

One exemplary embodiment of an apparatus for purifying the mixed water and salt waste product of spent BHP comprises a centrifuge or other crystallization chamber figured to receive a waste slurry composed of a mixture of water crystals (ice) and salt waste product in spent BHP and to perform separation of the slurry into a liquid and wetted solid portion. A filtering device collects the crystallized mixed ice-salt product from the slurry, and a heat source applies a warming influence to the crystallized mixed ice-salt product to generate an aqueous rinsing liquid on the surface of the crystallized mixed ice-salt product during the filtering process. Centrifugal force applied to the aqueous rinsing liquid appropriately causes a continuous displacement of the liquid film wetting the surface of the crystallized mixed ice-salt product, and this continuous displacement of the liquid surface film causes a progressive dilution of residual spent BHP on the surface of the crystallized mixed ice-salt product until a desired level of purification is achieved.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of fuels regeneration for a COIL laser system. One aspect of the fuels regeneration process is the removal and purification of the water and salt by-products from the spent BHP emitted from the lasing process. In an exemplary liquid processing system, the spent BHP is frozen into a slurry of ice (water crystals) and salt crystals in spent BHP aqueous solution, and then separated into liquid and wet solid portions. To remove even more BHP from the wet crystals, a water displacement process may be provided to enable an aqueous wash to operate at temperatures below the freezing point of water, thereby progressively diluting the spent BHP until a desired level of purity is achieved.

Figure 1:
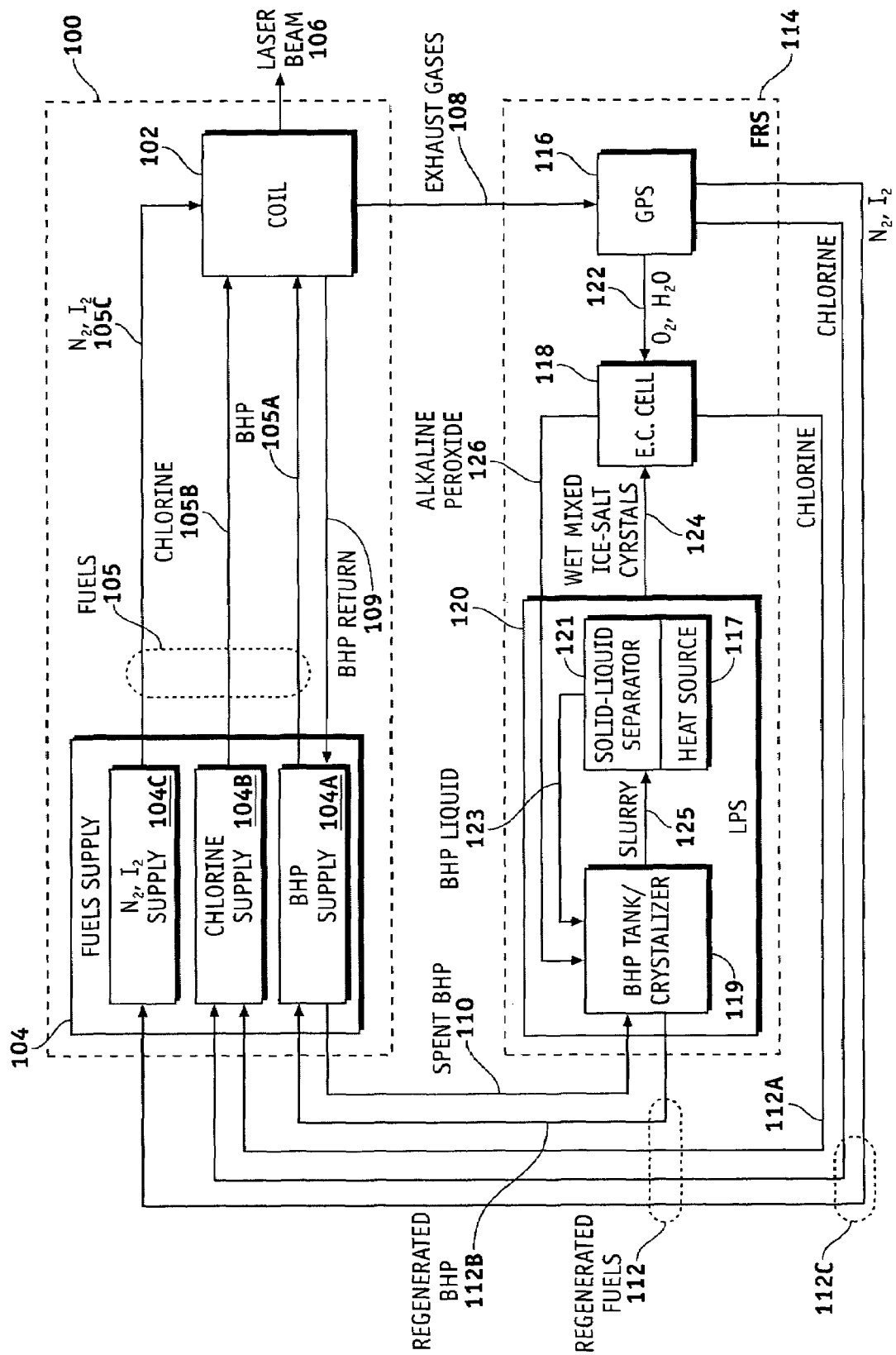
FIG. 1 is a block diagram of an exemplary COIL laser and fuel regeneration system.

A typical chemical oxygen iodine laser (COIL) system 100 is shown in block diagram form in FIG. 1. In this embodiment, a COIL 102 is supplied with fuels 105 from a fuels supply 104. Typical fuels for COIL 102 include, for example, BHP, chlorine, an iodine/nitrogen mixture, and nitrogen. The BHP is typically constituted from potassium hydroxide and hydrogen peroxide in an aqueous (water) solution. As previously noted, COIL laser 102 typically operates by reacting BHP 105A with chlorine gas 105B to form singlet delta oxygen ($O_2(^1\Delta)$)—that reacts with iodine to produce photon emissions in the form of a laser beam 106. Because the molar flow rate of BHP 105A is much greater than the molar flow rate of chlorine 105B, only a small fraction of the BHP is consumed during a typical firing of COIL 102. The partially consumed BHP 109 is therefore recycled to the BHP fuel supply 104A for reuse. The lasing process also generates exhaust gases 108 and a spent BHP solution 110 as waste by-products. These waste by-products can be converted into reusable fuels 112 by a fuel regeneration system (FRS) 114 in order to replenish fuels supply 104.

FRS 114 typically includes three major sections: a gas processing system (GPS) 116, a reagent production system generally in the form of an electrochemical (EC) cell 118, and a liquid processing system (LPS) 120. Exhaust gases 108 from COIL 102 are typically routed to GPS 116 for processing into useful inputs 122 for EC cell 118, such as oxygen and water. Spent BHP solution 110 is typically routed from fuels supply 104 to LPS 120 for processing into useful inputs 124 for EC cell 118, such as salt and water. EC cell 118 is typically configured to process the salt, water, and oxygen inputs (124, 122) to produce chlorine 112a for fuels supply 104, and alkaline peroxide 126 which is returned to the LPS 120. Alkaline peroxide 126 is a mixture of regenerated KOH, regenerated $H_2O_2$ and a relatively large amount of excess water. LPS 120 is typically configured to supply regenerated BHP 112b to fuels supply 104, and GPS 116 is typically configured to supply recovered gases 112c (e.g., chlorine, iodine, nitrogen) to fuels supply 104.

Liquid processing system (LPS) 120 suitably recovers the by-product salt and water from the spent BHP 110, combines the alkaline peroxide 126 with the spent BHP, recovers the excess water introduced with the alkaline peroxide, and supplies the recovered salt and water 124 to EC cell 118. Conventionally, LPS 120 crystallizes the salt from the spent BHP, separates the salt crystals from liquid, and then distills water from the liquid. This method typically uses a crystallizer tank, a solid-liquid separator (e.g. centrifuge), and a vacuum still to accomplish these tasks. Water distillation is typically done under vacuum to keep the temperature as low as possible and thereby avoid decomposing the BHP, resulting in an operation that is inherently relatively large per unit mass processed due to the size of the vacuum still.

Alternatively, both the salt and water can be recovered through crystallization. Various compositions of fresh ("non-supercooled") to spent BHP have been observed over conventional laser operating temperatures (e.g. temperatures from about −20° C. to about −55° C.), and it has been found that both KOH and $H_2O_2$, (as well as their associated compounds) generally remain in the liquid phase over this temperature range. Moreover, the only solids in the BHP over this temperature range are typically KCl and water crystals. Stated another way, both KCl and water remain in the crystallized solid state under conventional laser operating temperatures, while KOH, $H_2O_2$ and their compounds remain in the liquid phase. As a result, KCL and water by-products can both be readily separated in crystalline form from liquid KOH and $H_2O_2$ through any conventional technique for separating solids from liquids (e.g. filtering, centrifuge, etc.). Because vaporizing water from the liquid state to the gaseous state requires significantly more energy (e.g. on the order of seven times more) than simply freezing liquid water into ice, crystallization of water can provide significant energy savings relative to distillation and other separation techniques.

At various times during the laser operation cycle, spent BHP may be received at LPS 120 as a mixture of KOH, $H_2O_2$, KCl and $H_2O$ in any proportion. In principle, partially freezing this mixture could cause any one of the four constituents, or any compounds formed from them, to precipitate. Without knowledge of the phase diagram for the particular mixture, the exact nature of the precipitate cannot be readily predicted. Nevertheless, it can be assumed that certain solids will precipitate in the BHP, thereby forming a slurry. Starting with fresh "non-supercooled" BHP at about −20° C. or so, KCl forms in the initial precipitate on the spent BHP. As the lasing process continues, water (ice) crystals eventually begin to form in addition to the KCl crystals. As more solids are formed in the BHP, the laser would eventually become inoperable. Generally, the particular level of BHP consumption where the laser becomes inoperable coincides with the onset of the formation of ice in the BHP.

In the exemplary embodiment of the invention shown in FIG. 1, the LPS 120 suitably includes a crystallizer tank 119 and a solid-liquid separator 121. At the transition point where the onset of ice formation occurs, about 75 percent or so of the total KCl is typically present in crystalline form, with the remaining 25% or so dissolved in the spent BHP. Using a solid-liquid separator 121, then, the solid portion of the KCl by-product can be initially recovered. By cooling the remaining liquid from −20° C. to about −50° C., an ice-salt mixture appropriately precipitates, allowing recovery of water and the balance of the KCl via the same solid-liquid separator 121. Because the composition of phases in equilibrium is independent of the amount of each phase, it can be concluded that if the alkaline peroxide 126 produced by the EC cell 118 is continuously combined with the slurry in the crystallizer 119, the excess water in the alkaline peroxide will also crystallize out and the concentration of KOH and $H_2O_2$ in the slurry will increase. At the ultimate completion of the process, crystallizer 119 will therefore contain solid-free, full-strength BHP at about −50° C., in addition to the requisite amount of by-product KCl and water. Further, the excess water in the alkaline peroxide will have been separated out by the solid-liquid separator for delivery 124 to the EC Cell 118.

The exemplary embodiment of the LPS 120 in FIG. 1 therefore includes a tank or other crystallizer chamber 119 and a suitable solid-liquid separator 121 such as a pressure or vacuum filter and/or any type of centrifuge (e.g. a scroll/screen centrifuge or the like).

In operation, a slurry of KCl crystals in spent BHP 110 at about −20° C. or so is transferred from COIL 102 to chamber 119. Slurry 125 from chamber 119 is subsequently transferred to solid-liquid separator 121, which appropriately separates slurry 125 into a liquid portion 123 that is returned to crystallizer 119 and a wet solid portion 124 that is transferred to EC cell 118. As noted above, separator 121 may be any type of filter, centrifuge, or other structure capable of separating liquid and solid materials from slurry 125. At the onset of the lasing process, the solid material in spent BHP 110 is predominantly, if not entirely, KCl. When the initial KCl has been separated from the liquid portion, chamber 119 is cooled to promote crystallization of the remaining material in the chamber. As alkaline peroxide 126 is produced by EC cell 118, alkaline peroxide 126 is added to chamber 119, thereby increasing the amounts of KOH, $H_2O_2$, and water in the crystallizing chamber. As the temperature decreases, an ice-salt mixture precipitates in chamber 119, thereby reducing the amounts of water and KCl in the liquid. The solid-liquid separator 121 appropriately separates the resulting slurry 125 into a liquid portion 123 that returns to chamber 119, and a mixed ice-salt wet solid portion 124 that is sent to the EC cell 118. The crystallization process can continue for any length of time, and/or may run continuously until all the KCl and water by-products and excess water from the alkaline peroxide are recovered for use in EC cell 118. Recovered solid-free, regenerated BHP suitably remains in the crystallizer at about −50° C. or so, ready for subsequent re-use.

Although solid-liquid separators 121 appropriately remove liquid 123 from slurry 125, the remaining solids (e.g. KCl and ice) are typically wet with a film of BHP liquid that remains in chamber 121. Because the presence of BHP in feedstock 124 of EC cell 118 could reduce the efficiency of EC cell 118, solid-liquid separator 121 suitably reduces the amount of BHP wetting the crystals by any appropriate technique. There are two types of wet solid involved in this process: first, wet KCl; and second, wet mixed ice-KCl. KCl crystals wet with BHP can be purified sufficiently in a centrifuge by the application of sufficient G-force. The mixed ice-salt wet solids, however, are not typically adequately purified sufficiently by G-force alone because the ice crystals are generally relatively soft, and therefore easily deformed by mechanical forces.

Various conventional solid-liquid separators 121 have built-in rinsing capabilities to wash the mother liquor off the crystals using any readily available fluid (e.g. water). Water, however, is generally not suitable for use in materials that operating below the 0° C. freezing point, making water unsuitable for most processes operating in the conventional operating range for most COIL lasers. Nevertheless, the ice-salt mixture can be rinsed with "water" below the freezing point by simply warming the mixture under a relatively low-force field. After the initial KCl crystals are separated (e.g. at about −20° C. or so), the liquid phase can be cooled, precipitating additional mixed ice-salt crystals. The remaining slurry may then be centrifuged at a relatively low G (e.g. on the order of 200 G or so) so as not to compress the ice.

The resulting wet mixed ice-salt crystals can then be warmed (e.g. using heat source 117 or any other heating/cooling structure within LPS 120), either with or without applied centrifugal force. Changing the temperature of the wet ice-salt crystals causes some ice to melt until the remaining liquid wetting the crystals has a composition that would be in equilibrium with solid ice and KCl phases at the warmer temperature. Continued centrifuging has not been observed to have significant effects upon the resulting weight percentages of KOH and $H_2O_2$ obtained (i.e. the composition of the liquid phase in equilibrium with ice and salt is primarily a function of the temperature). The particular yield of purified wet mixed ice-salt has been observed to be significantly greater (e.g. on the order of five times or so greater) with G-force applied during the warming. In both cases, however, desired purity levels can be achieved by warming the mixed ice-salt crystals and "dewatering" the resultant wet solid. Without centrifugal force, the purification can be considered somewhat analogous to a dilution rinse, whereas centrifugal force applied during the warming is somewhat analogous to a displacement rinsing, in which the liquid film wetting the crystals is continuously displaced with incrementally less concentrated solution. The warming process may be continued for any period of time (either with or without centrifuging) to arrive at a desired purity level for the recovered materials.

Figure 2:
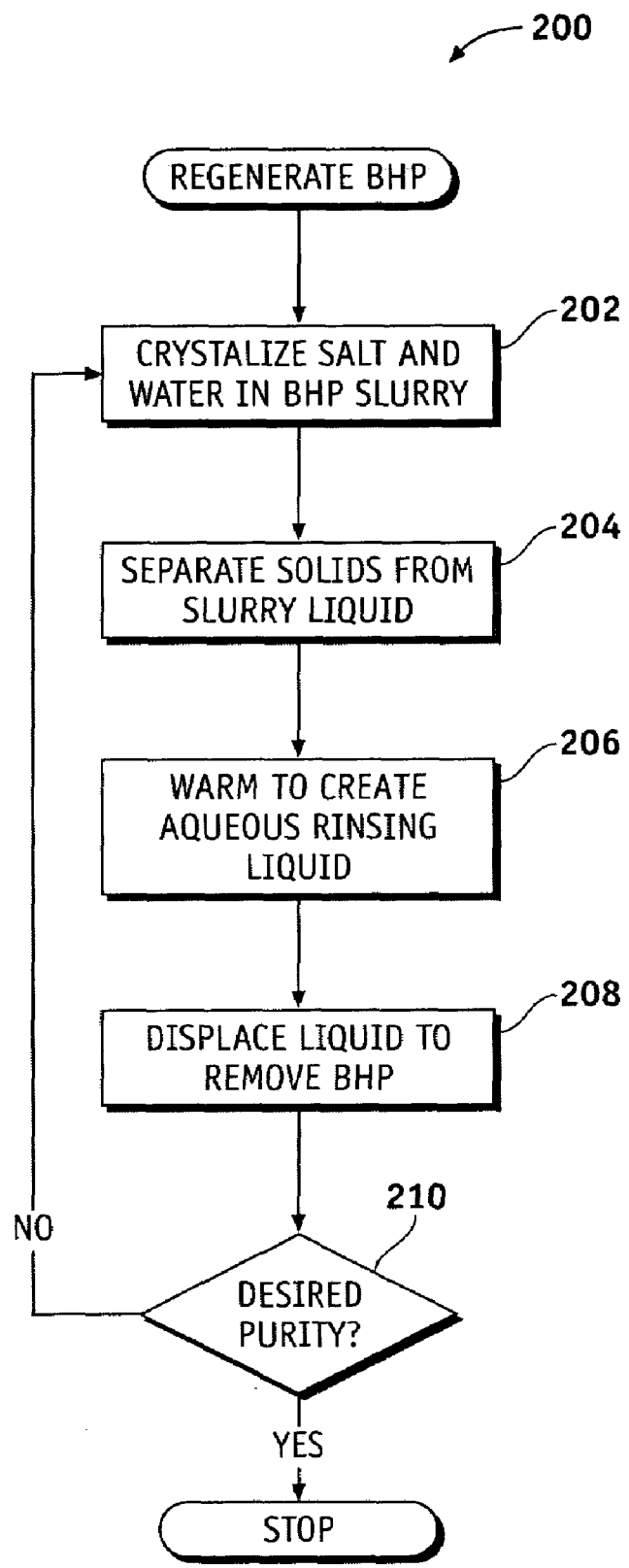
FIG. 2 is a flowchart of an exemplary process for regenerating fuel for a COIL laser.

With reference now to FIG. 2, an exemplary process 200 for regenerating fuel for a COIL 102 is shown. As described above, spent BHP is received at a crystallizing chamber (e.g. chamber 120), where salt (KCl) and water is cooled to create a crystallized product of water (ice) and salt in a BHP slurry (step 202). The solid crystallized product is readily separated (step 204) from the remaining BHP slurry by filtering, centrifuging or the like. Various embodiments of LPS 120 therefore may consist of two primary steps in which the initial salt crystals are first separated and purified, with the remaining BHP and alkaline peroxide mixture subsequently cooled to precipitate ice and the remaining KCl. The remaining precipitate is then separated and purified using a similar process. In the two step process, the first step of separating and purifying the initial KCl may be accomplished in a number of ways. It could be recovered and purified by centrifuging the slurry with sufficient G-force, for example. Alternatively, it could be recovered with a centrifuge or filter, warmed above 0° C. and rinsed with water, or warmed above the KCl—$H_2O$ eutectic temperature and rinsed with the corresponding equilibrium saturated KCl solution (steps 206, 208). The mixed ice-salt solids are then separated with either a centrifuge or a filter in which the conventional built-in water rinse is replaced with a heat source 117, such as a radiant heat source, hot gas stream, resistance heater, or the like. In the case of a centrifuge, the centrifugal force can be applied continuously during warming, although force may alternatively be discontinued during the warming process. In the case of a filter, the filter's driving force, for example gas pressure or vacuum, would be applied more or less continuously during warming. The rinse liquid extracted is returned along with the liquid BHP 123 to the crystallizer chamber 119 (step 210). In this way the wet mixed ice-salt crystals are purified to the extent desired. Alternatively, LPS 120 may employ a single step process in which the initial KCl solids, ice and KCl precipitated by cooling the mixture are recovered and purified at the same time.

While at least one exemplary embodiment has been presented in the foregoing detailed description, it should be appreciated that a vast number of variations exist. The particular values for temperatures, centrifugal force and other parameters are merely exemplary, for example, and may vary widely in any number of equivalent embodiments. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of purifying the waste products of spent basic hydrogen peroxide (BHP) emitted from a laser, comprising the steps of:
    at least partially crystallizing the spent BHP products to produce a crystallized product comprising a mixture of ice and salt crystals in a BHP slurry;
    separating the crystallized product from the slurry;
    warming the crystallized product to generate an aqueous rinsing liquid on the surface of the crystallized product; and
    displacing the aqueous rinsing liquid on the surface of the crystallized product to remove residual spent BHP.

2. The method of claim 1 wherein the crystallizing step includes the application of an environmental temperature in the range of −20 to −50 degrees Celsius.

3. The method of claim 1 wherein the separating step comprises filtering the crystallized salt product from the slurry by centrifugal force.

4. The method of claim 1 wherein the separating step comprises filtering the crystallized salt product from the slurry by pressure.

5. The method of claim 1 wherein the separating step comprises filtering the crystallized salt product from the slurry by vacuum.

6. The method of claim 1 further comprising repeating at least the crystallizing, separating and warming steps with the crystallized product.

7. The method of claim 1 wherein the continually displacing step comprises the application of a centrifugal force to the aqueous rinsing liquid on the surface of the crystallized salt product, the centrifugal force causing a substantially continuous displacement of the aqueous rinsing liquid.

8. The method of claim 7 wherein the continuous displacement of the aqueous rinsing liquid causes a progressive dilution of the residual spent BHP on the surface of the crystallized salt product.

9. The method of claim 7 wherein the applied centrifugal force is in the range of 100 to 300 G.

10. An apparatus for recycling spent basic hydrogen peroxide (BHP) emitted from a laser, comprising:
    a crystallizing chamber configured to receive the spent BHP, and to at least partially crystallize the spent BHP products to produce a crystallized product comprising a mixture of ice and salt crystals in a BHP slurry;
    a separator configured to separate out the crystallized salt product from the slurry by centrifugal force; and
    a heat source configured to apply a warming influence to the crystallized salt product to generate an aqueous rinsing liquid on the surface of the crystallized salt product during the separating process.

11. The apparatus of claim 10 wherein a centrifugal force applied to the aqueous rinsing liquid causes a continuous displacement of the aqueous rinsing liquid on the surface of the crystallized salt product, and wherein the continuous displacement of the aqueous rinsing liquid causes a progressive dilution of residual spent BHP on the surface of the crystallized salt product until a predetermined level of purification is achieved.

12. The apparatus of claim 11 wherein the centrifugal force is in the approximate range of 200 to 270 G.

13. The apparatus of claim 10 wherein the heat source is a radiant heater.

14. The apparatus of claim 10 wherein the heat source is a warm gas.

15. The apparatus of claim 10 wherein the heat source is steam.

16. The apparatus of claim 10 wherein the heat source is a resistive heating arrangement.

17. The apparatus of claim 10 wherein the heat source is a heat transfer fluid flowing through conduits in the centrifuge.

18. A COIL laser system, comprising:
    a COIL laser;
    a fuel supply configured to supply basic hydrogen peroxide (BHP) to the COIL laser; and
    a fuel regeneration system configured to receive the spent BHP waste products resulting from the lasing process in the COIL laser and to process the BHP waste products into purified salt and water products for use in regenerating a BHP fuel supply, the fuel regeneration system comprising:
    a crystallization chamber configured to receive the spent BHP waste products and to least partially crystallize the spent BHP products to produce a crystallized product comprising a mixture of ice and salt crystals in a BHP slurry;
    a filtering device configured to separate the crystallized product from the slurry; and
    a heat source configured to apply a warming influence to the crystallized salt product to generate an aqueous rinsing liquid on the surface of the crystallized salt product during the separating process.

19. The COIL laser of claim 18 wherein the centrifugal force applied to the aqueous rinsing liquid causes a substantially continuous displacement of the aqueous rinsing liquid on the surface of the crystallized product.

20. The COIL laser of claim 19 wherein the continuous displacement of the aqueous rinsing liquid causes a progressive dilution of residual spent BHP on the surface of the crystallized product until a predetermined level of purification is achieved.

* * * * *